(12) United States Patent
Lee et al.

(10) Patent No.: US 12,278,323 B2
(45) Date of Patent: Apr. 15, 2025

(54) BATTERY TRANSPORTING APPARATUS

(71) Applicant: LG ENERGY SOLUTION, LTD., Seoul (KR)

(72) Inventors: Dong-Hee Lee, Daejeon (KR); Sung-Guk Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 594 days.

(21) Appl. No.: 17/637,306

(22) PCT Filed: May 13, 2020

(86) PCT No.: PCT/KR2020/006286
§ 371 (c)(1),
(2) Date: Feb. 22, 2022

(87) PCT Pub. No.: WO2021/071040
PCT Pub. Date: Apr. 15, 2021

(65) Prior Publication Data
US 2022/0278350 A1  Sep. 1, 2022

(30) Foreign Application Priority Data
Oct. 11, 2019  (KR) ........................ 10-2019-0126477

(51) Int. Cl.
*H01M 10/04* (2006.01)
*B65D 25/10* (2006.01)
(Continued)

(52) U.S. Cl.
CPC ..... *H01M 10/0404* (2013.01); *B65D 2585/88* (2013.01); *H01M 50/256* (2021.01)

(58) Field of Classification Search
CPC ............ H01M 10/0404; H01M 50/256; B65D 2585/88
(Continued)

(56) References Cited

U.S. PATENT DOCUMENTS

| 2007/0266553 A1 | 11/2007 | Schlogl |
| 2012/0312719 A1 | 12/2012 | Fan et al. |

FOREIGN PATENT DOCUMENTS

| CN | 105966753 A | 9/2016 |
| CN | 109449496 A | 3/2019 |

(Continued)

OTHER PUBLICATIONS

Extended European Search Report for corresponding European Application No. 20875105.7, dated Sep. 8, 2023.
(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

A battery transporting apparatus includes a frame member configured to support a battery cell; a cell support member movably mounted to the frame member to be adjustable in a thickness direction of the battery cell among length, width and thickness directions of the battery cell and configured to support a center portion of the battery cell; a rotary shaft coupled to the frame member; and a moving member coupled to the cell support member and coupled to the rotary shaft to move along the rotary shaft when the rotary shaft rotates so that the cell support member is moved.

9 Claims, 8 Drawing Sheets

(51) Int. Cl.
*B65D 81/05* (2006.01)
*B65D 85/30* (2006.01)
*B65D 85/68* (2006.01)
*H01M 10/052* (2010.01)
*H01M 50/105* (2021.01)
*H01M 50/256* (2021.01)

(58) Field of Classification Search
USPC .......................................................... 429/99
See application file for complete search history.

(56) References Cited

FOREIGN PATENT DOCUMENTS

| | | |
|---|---|---|
| JP | 2000-100480 A | 4/2000 |
| KR | 20-2000-0017753 U | 10/2000 |
| KR | 100541922 B1 * | 11/2006 |
| KR | 10-2010-0044418 A | 4/2010 |
| KR | 10-2011-0091061 A | 8/2011 |
| KR | 10-1219279 B1 | 1/2013 |
| KR | 10-2013-0079738 A | 7/2013 |
| KR | 10-1307876 B1 | 9/2013 |
| KR | 10-1359983 B1 | 2/2014 |
| KR | 10-2015-0144608 A | 12/2015 |
| KR | 10-2017-0114852 A | 10/2017 |
| KR | 20170114852 A * | 10/2017 |
| KR | 10-1882647 B1 | 7/2018 |
| KR | 10-2019-0008698 A | 1/2019 |

OTHER PUBLICATIONS

International Search Report for PCT/KR2020/006286 mailed on Aug. 7, 2020.

* cited by examiner

BATTERY TRANSPORTING APPARATUS

TECHNICAL FIELD

The present application claims priority to Korean Patent Application No. 10-2019-0126477 filed on Oct. 11, 2019 in the Republic of Korea, the disclosures of which are incorporated herein by reference.

The present disclosure relates to a battery transporting apparatus, and more particularly, to a battery transporting apparatus capable of adjusting an interval in a thickness direction among length, width and thickness directions of a battery cell.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery (hereinafter, just referred to as a "battery") includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

Meanwhile, in a battery production line, a battery transporting device capable of receiving a large amount of thin batteries upright is used as a means for safely storing and transporting batteries when moving from a process to a process or when shipping finished products.

A conventional battery transporting device has a problem in that it is inconvenient to adjust an interval between main cassettes since a worker directly moves the main cassettes after releasing a bolt and nut and also the worker fixes the bolt and nut again after moving the main cassettes.

In particular, the conventional battery transporting device may be adjusted by a manual operation of the worker as described above only in a length direction of the battery cell among length, width and thickness directions of the battery cell, and it is not possible to adjust the conventional battery transporting device in a thickness direction. Thus, in order to transport battery cells of various thicknesses, battery transporting devices suitable for each thickness of the battery cells must be separately manufactured, which however causes inconvenient work and increased cost.

DISCLOSURE

Technical Problem

Therefore, the present disclosure is directed to providing a battery transporting apparatus, which may transport battery cells having various sizes in a thickness direction among length, width and thickness directions of the battery cell by using one transporting device.

Technical Solution

In one aspect of the present disclosure, there is provided a battery transporting apparatus, comprising: a frame member configured to support a battery cell; a cell support member movably mounted to the frame member to be adjustable in a thickness direction of the battery cell among length, width and thickness directions of the battery cell and configured to support a center portion of the battery cell; a rotary shaft coupled to the frame member; and a moving member coupled to the cell support member and coupled to the rotary shaft to move along the rotary shaft when the rotary shaft rotates so that the cell support member is moved.

Also, the cell support member may include a first support member having a plurality of first support portions spaced apart from each other at preset intervals, each of the first support portions having a hollow; and a second support member having a plurality of second support portions spaced apart from each other at preset intervals, the second support portions may be formed smaller than the first support portions, and the plurality of second support portions may movable through the hollows.

In addition, the first support portion may include a first straight section extending vertically; a second straight section extending vertically and spaced apart from the first straight section; and a third straight section configured to connect the first straight section and the second straight section.

Also, the first straight section, the second straight section, and the third straight section define the hollow.

In addition, the battery transporting apparatus may further comprise a rotating member coupled to the rotary shaft to rotate the rotary shaft, a first side of the rotary shaft may be coupled to the frame member and a second side of the rotary shaft may be coupled to the rotating member, and the rotary shaft may rotate in association with the rotation of the rotating member.

Also, the moving member may include a first moving member coupled to the first support member; and a second moving member coupled to the second support member, and the first moving member and the second moving member may move along the rotary shaft so that the first support member and the second support member move closer to each other or move away from each other.

In addition, the rotary shaft may include a first thread portion formed at a region to which the first moving member is coupled; a second thread portion formed at a region to which the second moving member is coupled; and a non-thread portion having no thread and provided between the first thread portion and the second thread portion, and the first thread portion and the second thread portion may have threads formed in opposite directions.

Also, the rotating member may include a connector guide coupled and fixed to the frame member; an elastic member provided to contact the rotary shaft; and a connector inserted into the connector guide to press the elastic member so that the elastic member is elastically contracted.

In addition, a perforated hole may be formed in the connector, a pressing bar may be provided vertically to an inner side of the connector, and the elastic member may be inserted into the perforated hole to be pressed by the pressing bar.

Also, the connector guide may include a first guide having an inner surface of a regular hexagonal shape; and a second guide having an inner surface of a circular shape, and the connector may include a first outer surface portion having a regular hexagonal shape to correspond to the first guide; and a second outer surface portion having an a circular shape to correspond to the second guide.

Advantageous Effects

According to embodiments of the present disclosure, since the cell support member supporting the center portion of the battery cell is adjustable in the thickness direction of the battery cell, it is possible to transport battery cells having various sizes in the thickness direction of the battery cell by using one transporting device.

In addition, since the first support member and the second support portion of the cell support member are moved by the operation of the thickness-wise moving member, it is easy to adjust the interval between the first support member and the second support member.

BEST MODE

Figure 1:
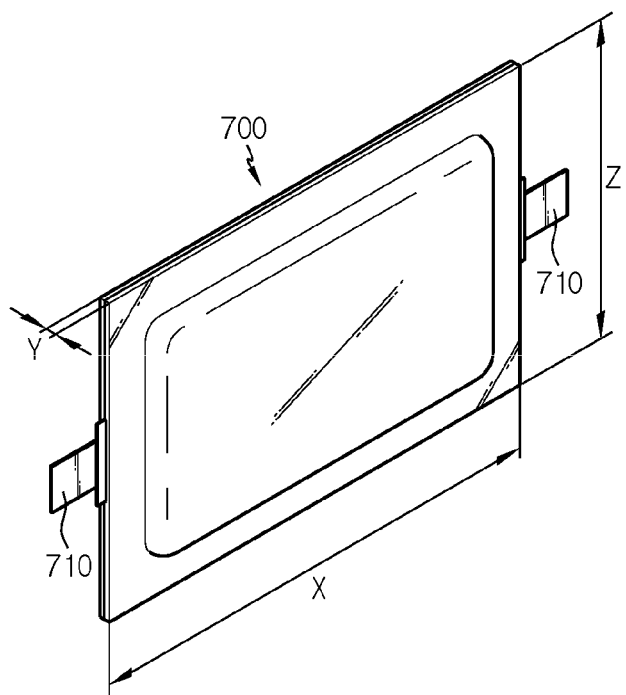
FIG. 1 is a schematic perspective view showing a battery cell that is transported by a battery transporting apparatus according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
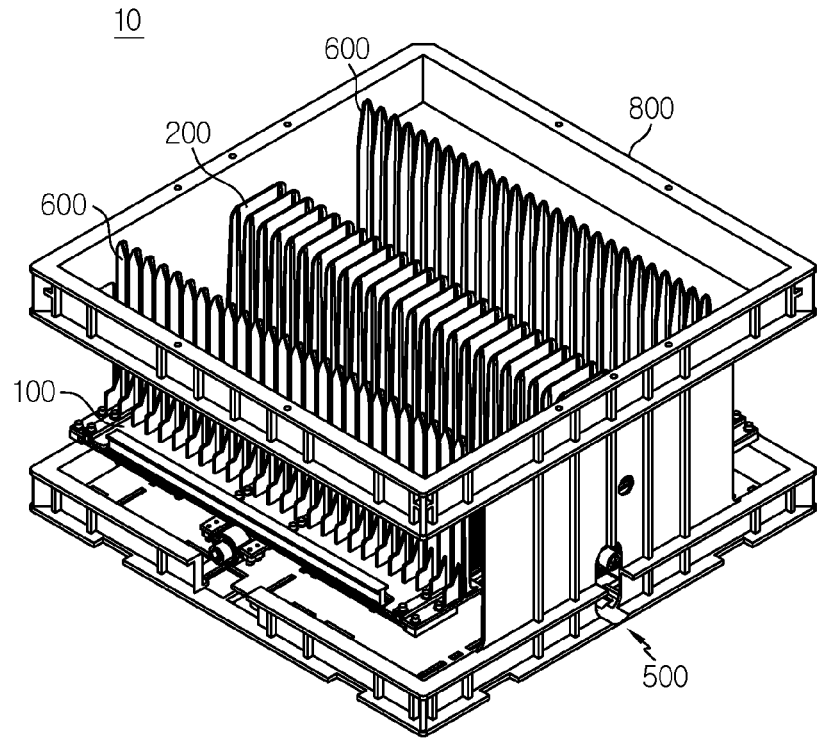
FIG. 2 is a perspective view showing the battery transporting apparatus according to an embodiment of the present disclosure entirely.
Figure 3:
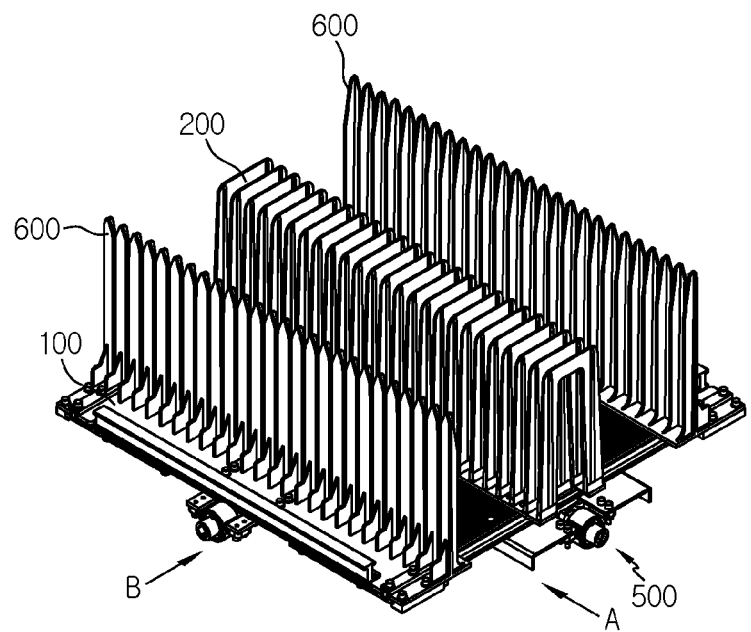
FIG. 3 is a perspective view showing a pair of electrode lead support members and a cell support member of FIG. 2 from which a protecting member is removed.
Figure 4:
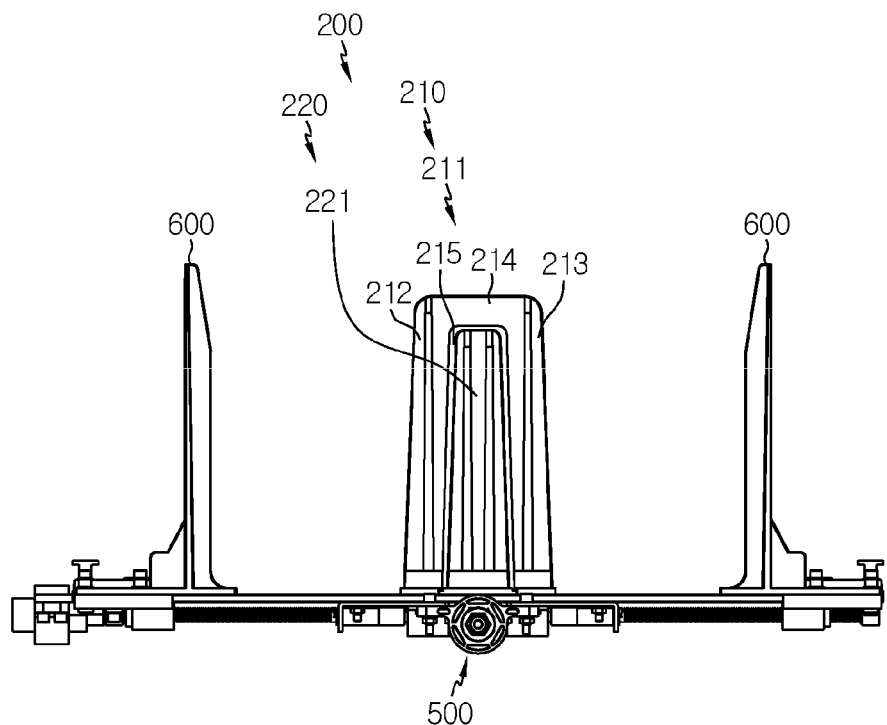
FIG. 4 is a diagram observed along an arrow A of FIG. 3.
Figure 5:
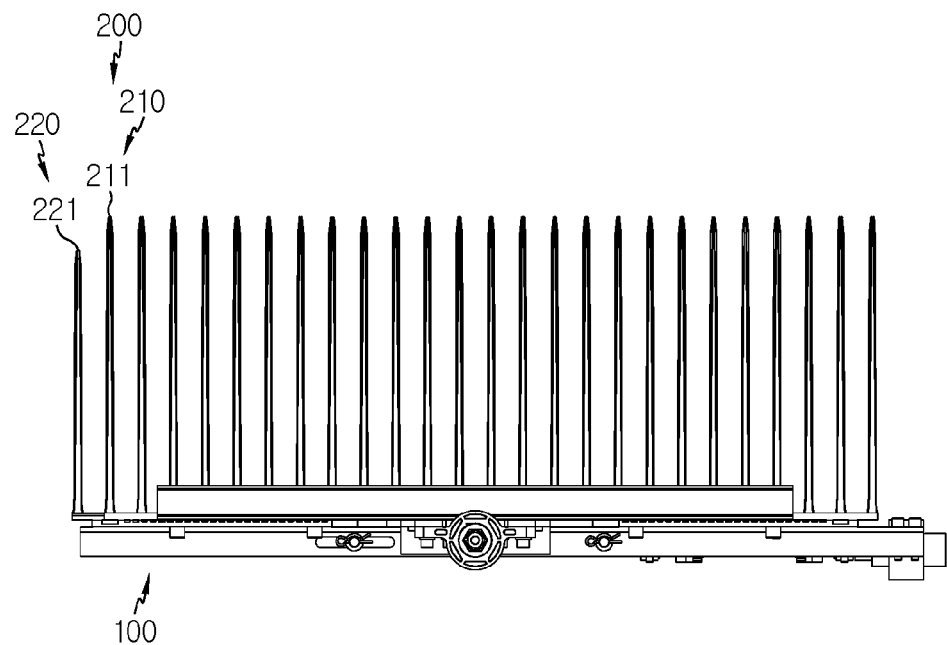
FIG. 5 is a diagram observed along an arrow B of FIG. 3 in which the pair of electrode lead support members are removed in FIG. 3, showing that a first support member and a second support member of the cell support member are moved closer to each other.
Figure 6:
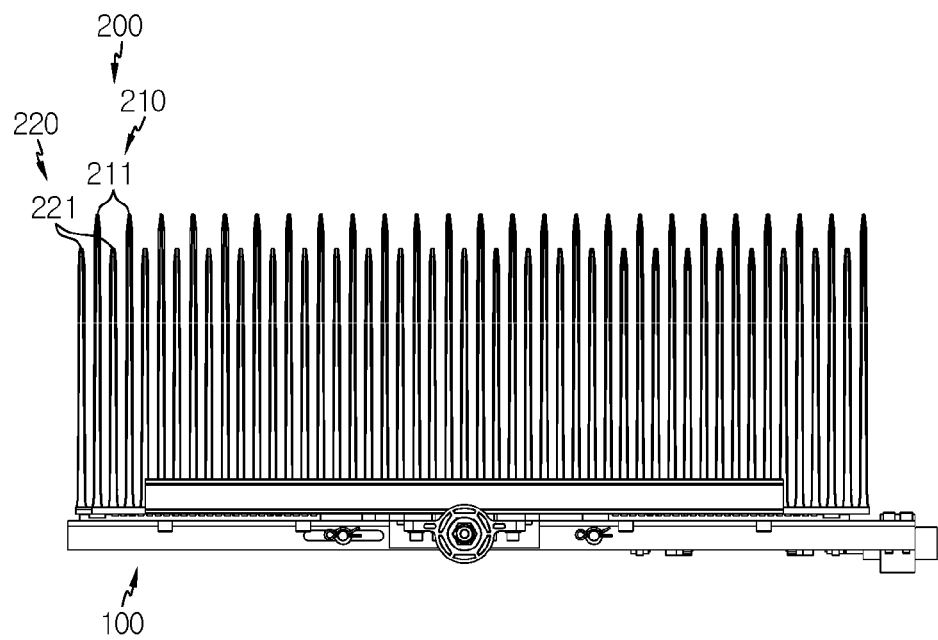
FIG. 6 is a diagram observed along the arrow B of FIG. 3 in which the pair of electrode lead support members are removed in FIG. 3, showing that the first support member and the second support member of the cell support member are moved away from each other.
Figure 7:
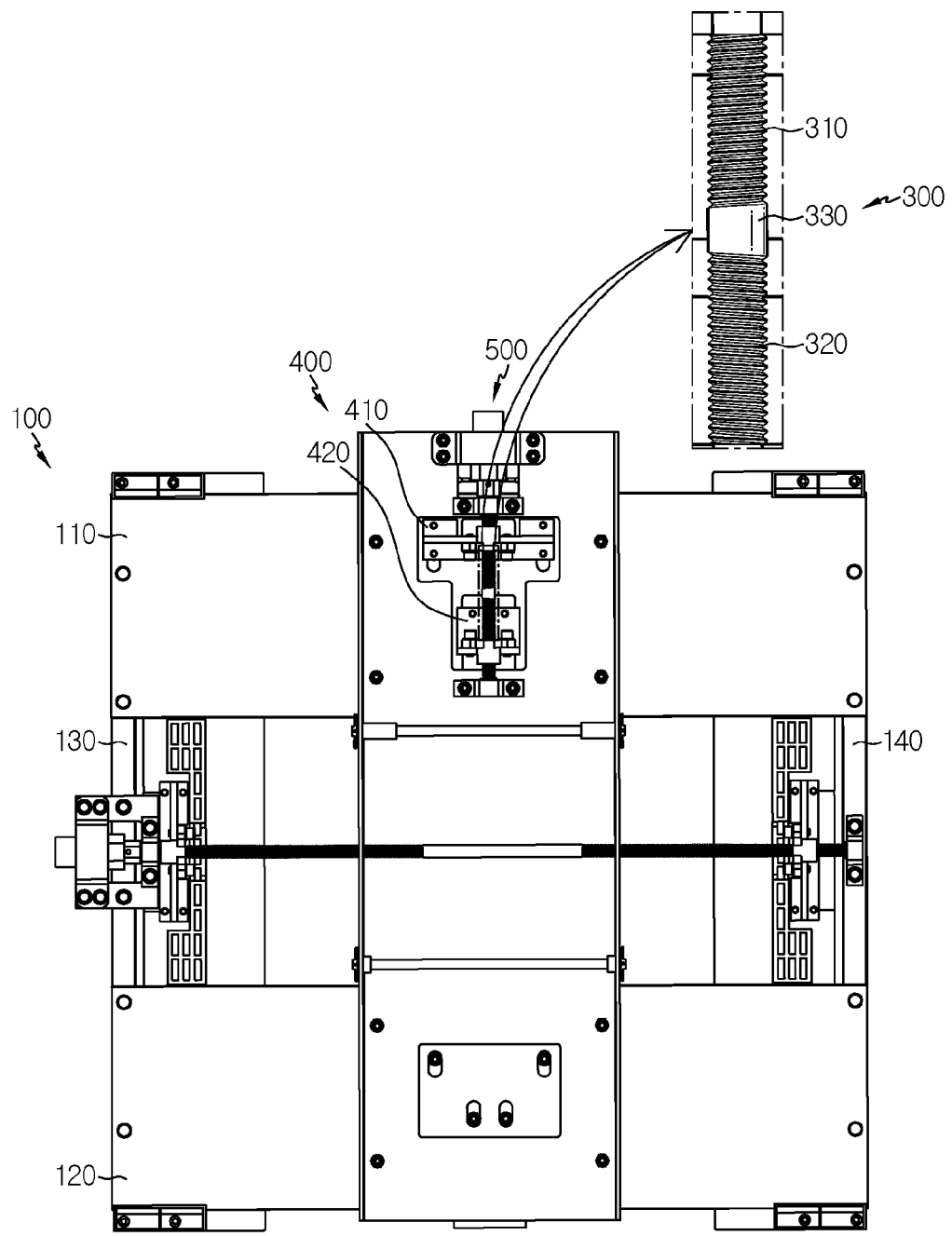
FIG. 7 is a bottom view of FIG. 3 and a partially enlarged view showing a thickness-wise rotary shaft.
Figure 8:
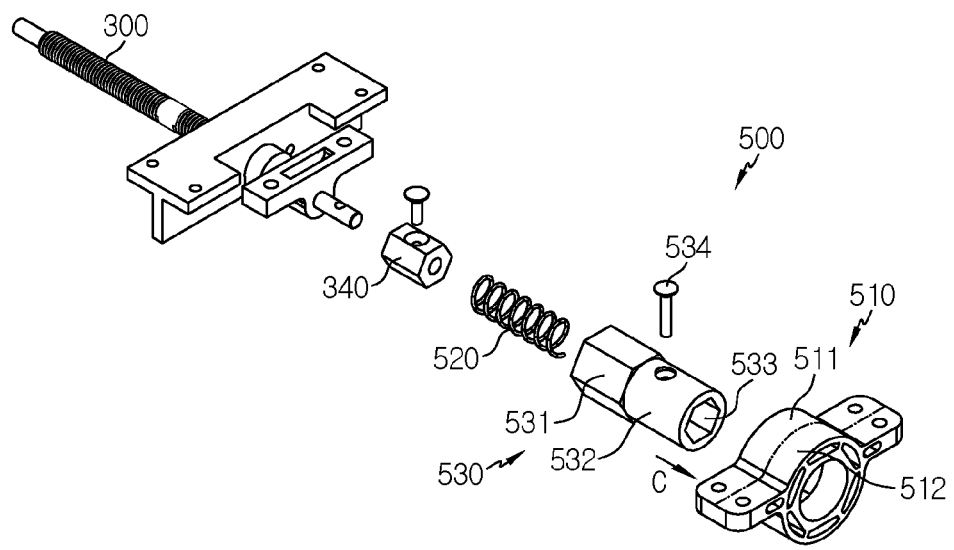
FIG. 8 is an exploded perspective view showing a thickness-wise rotating member of the battery transporting apparatus according to an embodiment of the present disclosure.
Figure 9:
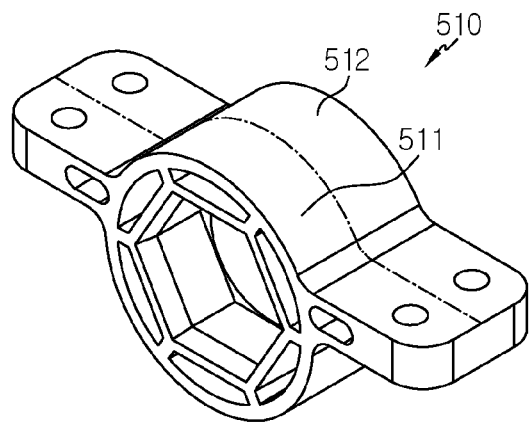
FIG. 9 is a diagram observed along an arrow C of FIG. 8 showing a thickness-wise connector guide.
Figure 10:
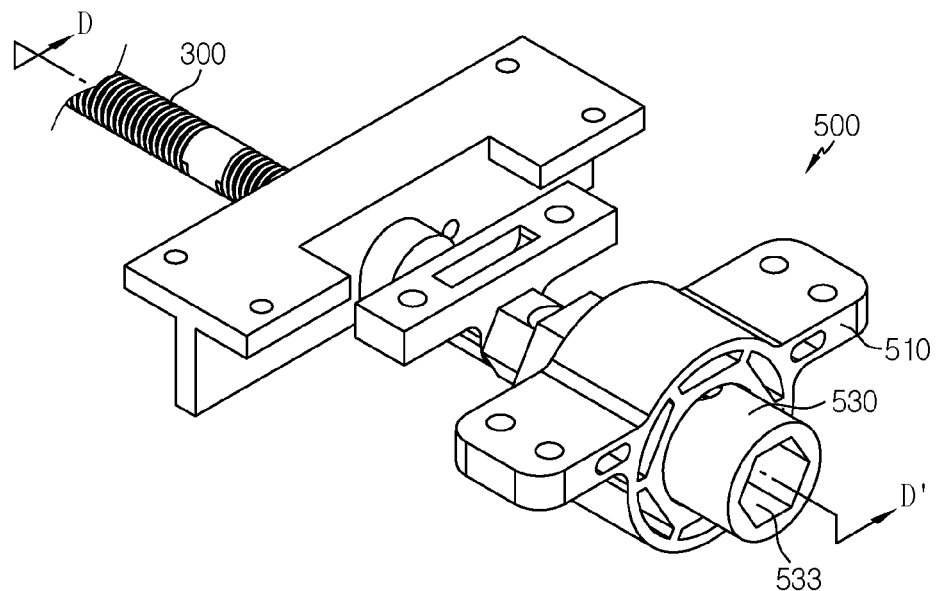
FIG. 10 is an assembled perspective view showing the thickness-wise rotating member of FIG. 8.
Figure 11:
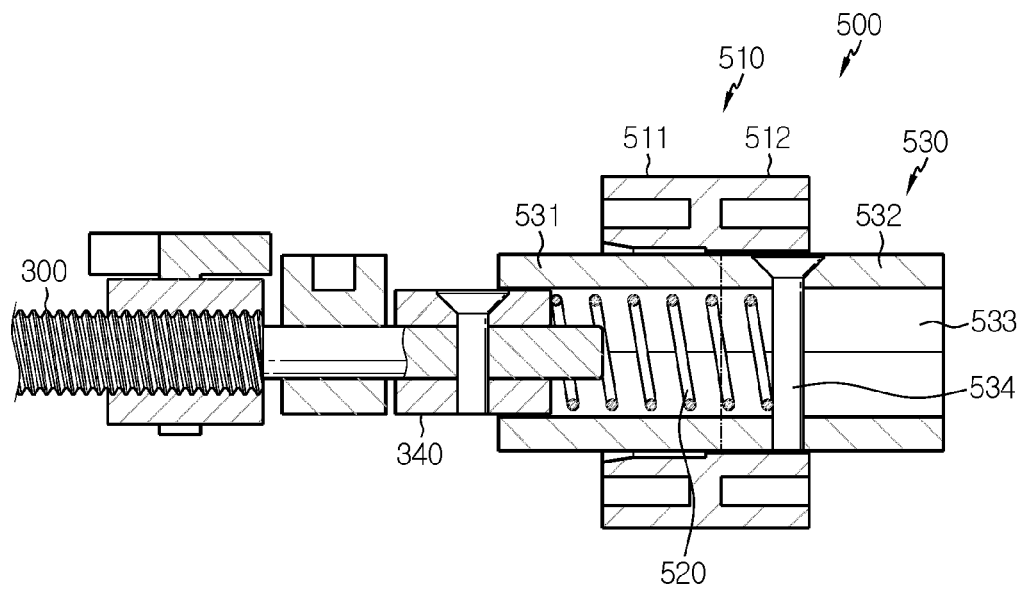
FIG. 11 is a cross-sectioned view, taken along the line D-D' of FIG. 10.
Figure 12:
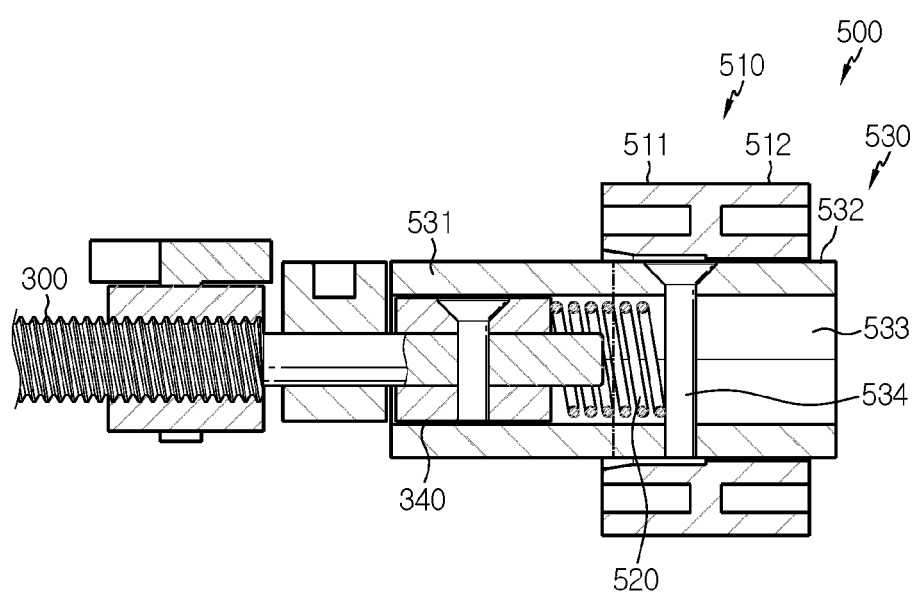
FIG. 12 is a cross-sectioned view showing that the thickness-wise connector is moved into the thickness-wise connector guide to operate the thickness-wise rotating member in FIG. 11.

FIG. 1 is a schematic perspective view showing a battery cell that is transported by a battery transporting apparatus according to an embodiment of the present disclosure, FIG. 2 is a perspective view showing the battery transporting apparatus according to an embodiment of the present disclosure entirely, FIG. 3 is a perspective view showing a pair of electrode lead support members and a cell support member of FIG. 2 from which a protecting member is removed, FIG. 4 is a diagram observed along an arrow A of FIG. 3, FIG. 5 is a diagram observed along an arrow B of FIG. 3 in which the pair of electrode lead support members are removed in FIG. 3, showing that a first support member and a second support member of the cell support member are moved closer to each other, FIG. 6 is a diagram observed along the arrow B of FIG. 3 in which the pair of electrode lead support members are removed in FIG. 3, showing that the first support member and the second support member of the cell support member are moved away from each other, FIG. 7 is a bottom view of FIG. 3 and a partially enlarged view showing a thickness-wise rotary shaft, FIG. 8 is an exploded perspective view showing a thickness-wise rotating member of the battery transporting apparatus according to an embodiment of the present disclosure, FIG. 9 is a diagram observed along an arrow C of FIG. 8 showing a thickness-wise connector guide, FIG. 10 is an assembled perspective view showing the thickness-wise rotating member of FIG. 8, FIG. 11 is a cross-sectioned view, taken along the line D-D' of FIG. 10, and FIG. 12 is a cross-sectioned view showing that the thickness-wise connector is moved into the thickness-wise connector guide to operate the thickness-wise rotating member in FIG. 11.

In this specification, a battery transporting apparatus 10 may have various forms, and may be formed as, for example, a battery transporting tray having a protecting member 800 (see FIG. 2). However, the present disclosure is not limited thereto.

Meanwhile, in this specification, length, width and thickness of the battery cell 700 will be described based on FIG. 1. That is, an X direction of FIG. 1 is a length direction of the battery cell 700, a Y direction of FIG. 1 is a thickness direction of the battery cell 700, and a Z direction of FIG. 1 is a width direction of the battery cell 700.

Referring to the drawings, the battery transporting apparatus 10 according to an embodiment of the present disclosure includes a frame member 100, a cell support member 200, a thickness-wise rotary shaft 300, and a thickness-wise moving member 400.

The battery transporting apparatus 10 according to an embodiment of the present disclosure is adjustable in a thickness direction of the battery cell 700 among length, width and thickness directions of the battery cell 700.

The frame member 100 is provided to support the battery cell 700. The battery cell 700 may have various structures, and an electrode lead 710 is provided thereto. The electrode lead 710 provided to the battery cell 700 is a type of terminal exposed to the outside and connected to an external device, and may be made of a conductive material.

The electrode lead 710 includes a positive electrode lead and a negative electrode lead. The positive electrode lead and the negative electrode lead may be disposed in opposite directions with respect to the length direction of the battery cell 700, or the positive electrode lead and negative electrode lead may be disposed in the same direction with respect to the length direction of the battery cell 700.

The electrode lead 710 may be electrically coupled to a bus bar. The battery cell 700 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 700 may be provided in various forms, but for convenience of explanation, it will be described that the battery cell 700 is a pouch-type battery cell as shown in FIG. 1.

The frame member 100 may support the battery cell 700 in various ways. For example, the cell support member 200 may be mounted to the frame member 100, and the cell support member 200 mounted to the frame member 100 may be configured to support a center portion of the battery cell 700. In addition, if an electrode lead support member 600 is further provided, the electrode lead support member 600 may be mounted to the frame member 100 to support the electrode lead 710 of the battery cell 700. Here, the electrode lead support member 600 may be configured to be fixed or adjustable.

The frame member 100 may include a first frame 110 second frame 120, a third frame 130 and a fourth frame 140. The frame member 100 may be formed in various shapes and, for example, may be formed in a square shape. However, the shape of the frame member 100 is not limited thereto, and the frame member 100 may be provided as a single plate.

The cell support member 200 is movably mounted to the frame member 100 and is adjustable in the thickness direction of the battery cell 700 among length, width and thickness directions of the battery cell 700 and configured to support the center portion of the battery cell 700.

Referring to FIGS. 5 and 6, the cell support member 200 may include a first support member 210 and a second support member 220. Referring to FIGS. 4 to 6, the first support member 210 may include a plurality of first support portions 211 having a hollow 215 formed therein and spaced apart from each other at preset intervals. For example, the first support portion 211 may include a first straight section 212, a second straight section 213 and a third straight section 214.

The first straight section 212 is formed in the vertical direction. The first straight section 212 may be sloped within a preset range in the vertical direction. The second straight section 213 is spaced apart from the first straight section 212 and formed in the vertical direction. The second straight section 213 may also be sloped within a preset range in the vertical direction. The third straight section 214 connects the first straight section 212 and the second straight section 213. For example, the third straight section 214 may be provided to connect the first straight section 212 and the second straight section 213 at upper sides of the first straight section 212 and the second straight section 213.

Referring to FIGS. 4 to 6, the second support member 220 may include a plurality of second support portions 221 spaced apart from each other at preset intervals. Here, the second support portion 221 of the second support member 220 may be formed smaller than the first support portion 211 of the first support member 210, and the plurality of second support portions 221 may be inserted into the hollows 215 of the plurality of first support portions 211 to move through the hollows 215.

That is, the second support portion 221 may be inserted into the hollow 215 formed by the first straight section 212, the second straight section 213 and the third straight section 214 of the first support portion 211.

Here, the center portion of the battery cell 700 may be placed and supported between the first support portion 211 and the second support portion 221. That is, if the plurality of second support portions 221 are inserted into the hollows 215 of the plurality of first support portions 211 to move through the hollows 215, as shown in FIGS. 5 and 6, the interval between the first support portion 211 and the second support portion 221 may be adjusted. Thus, battery cells 700 of various sizes, especially various battery cells 700 having various sizes in the thickness direction, may be accommodated and supported between the first support portion 211 and the second support portion 221.

The thickness-wise rotary shaft 300 is configured to rotate in a state of being coupled to the frame member 100.

Referring to FIG. 7, a first thread portion 310, a second thread portion 320 and a non-thread portion 330 may be formed at the rotary shaft 300.

In addition, the first thread portion 310 and the second thread portion 320 have threads formed in opposite directions, and the non-thread portion 330 having no thread is provided between the first thread portion 310 and the second thread portion 320.

In addition, a thickness-wise first moving member 410 is coupled to the thickness-wise first thread portion 310, and a thickness-wise second moving member 420 is coupled to the thickness-wise second thread portion 320.

Here, if the thickness-wise rotary shaft 300 rotates in one direction, the thickness-wise first moving member 410 and the thickness-wise second moving member 420 move closer to each other, and if the thickness-wise rotary shaft 300 rotates in another direction, the thickness-wise first moving member 410 and the thickness-wise second moving member 420 move away from each other.

A thickness-wise moving member 400 is coupled to the thickness-wise rotary shaft 300 to move along the thickness-wise rotary shaft 300 when the thickness-wise rotary shaft 300 rotates, and is coupled to the cell support member 200 to move the cell support member 200.

The thickness-wise moving member 400 may include a thickness-wise first moving member 410 and a thickness-wise second moving member 420. The thickness-wise first moving member 410 is coupled to the first support member 210 of the cell support member 200. In addition, the thickness-wise second moving member 420 is coupled to the second support member 220 of the cell support member 200.

The thickness-wise first moving member 410 and the thickness-wise second moving member 420 may be coupled to the thickness-wise rotary shaft 300 to move along the thickness-wise rotary shaft 300.

As the thickness-wise rotary shaft 300 rotates, the thickness-wise first moving member 410 and the thickness-wise second moving member 420 coupled to the thickness-wise rotary shaft 300 move closer to each other or move away from each other.

Here, since the first support member 210 of the cell support member 200 is coupled to the thickness-wise first moving member 410 and the second support member 220 of the cell support member 200 is coupled to the thickness-wise second moving member 420, as the thickness-wise first moving member 410 and the thickness-wise second moving member 420 move, the first support member 210 and the second support member 220 of the cell support member 200 also move.

That is, if the thickness-wise first moving member 410 and the thickness-wise second moving member 420 move closer to each other along the thickness-wise rotary shaft 300, the first support member 210 and the second support member 220 also move closer to each other as shown in FIG. 5, and if the thickness-wise first moving member 410 and the thickness-wise second moving member 420 move away from each other along the thickness-wise rotary shaft 300, the first support member 210 and the second support member 220 also move away from each other as shown in FIG. 6.

A thickness-wise rotating member 500 is coupled to the thickness-wise rotary shaft 300 to rotate the thickness-wise rotary shaft 300. The thickness-wise rotary shaft 300 may be rotated in various ways. A worker may manually rotate the thickness-wise rotary shaft 300, or a tool may be used to rotate the thickness-wise rotary shaft 300. Alternatively, the thickness-wise rotating member 500 may be coupled to the thickness-wise rotary shaft 300, and the thickness-wise rotary shaft 300 may be rotated by means of the thickness-wise rotating member 500.

Here, one side of the thickness-wise rotary shaft 300 may be coupled to the frame member 100, and the other side of the thickness-wise rotary shaft 300 may be coupled to the thickness-wise rotating member 500. In addition, if the thickness-wise rotating member 500 rotates, the thickness-wise rotary shaft 300 also rotates in association with the rotation of the thickness-wise rotating member 500.

Referring to FIG. 8, the thickness-wise rotating member 500 may include a thickness-wise connector guide 510, a thickness-wise elastic member 520 and a thickness-wise connector 530.

The thickness-wise connector guide 510 is coupled and fixed to the frame member 100.

The thickness-wise connector guide 510 may include a thickness-wise first guide 511 and a thickness-wise second guide 512. The thickness-wise first guide 511 may have an inner surface of a polygonal shape. For example, referring to FIG. 9, the thickness-wise first guide 511 may have an inner surface of a regular hexagonal shape. Hereinafter, for convenience of description, it will be described that the inner surface of the thickness-wise first guide 511 has a regular hexagonal shape, but the present disclosure is not limited thereto.

In addition, referring to FIG. 8, the thickness-wise second guide 512 may have an inner surface of a circular shape. Here, the thickness-wise first guide 511 and the thickness-wise second guide 512 may have an integrated form or be detachably formed.

The thickness-wise elastic member 520 is inserted into the thickness-wise connector 530 to contact the thickness-wise rotary shaft 300. The thickness-wise elastic member 520 transmits an elastic recovery force to the thickness-wise connector 530. This will be described later in detail.

The thickness-wise connector 530 is inserted into the thickness-wise connector guide 510 and presses the thickness-wise elastic member 520 so that the thickness-wise elastic member 520 is elastically contracted. For example, a perforated hole 533 is formed in the thickness-wise connector 530, and a thickness-wise elastic member 520 is inserted into the perforated hole 533. In addition, a pressing bar 534 is provided vertically to an inner side of the thickness-wise connector 530. As shown in FIG. 12, when the thickness-wise connector 530 is inserted into the thickness-wise connector guide 510, the pressing bar 534 presses the thickness-wise elastic member 520.

A thickness-wise first outer surface portion 531 and a thickness-wise second outer surface portion 532 may be formed at the thickness-wise connector 530. The thickness-wise first outer surface portion 531 has an outer surface of a regular hexagonal shape to correspond to the thickness-wise first guide 511. Here, the outer surface of the thickness-wise first outer surface portion 531 is not limited to the regular hexagonal shape, and may have various shapes to correspond to the shape of the inner surface of the thickness-wise first guide 511. In addition, the thickness-wise second outer surface portion 532 has an outer surface of a circular shape to correspond to the thickness-wise second guide 512.

When a tool such as a hexagonal wrench is coupled to the thickness-wise connector 530 to give a pressure, referring to FIG. 12, the pressing bar 534 provided to the thickness-wise connector 530 elastically contracts the thickness-wise elastic member 520, and the thickness-wise second outer surface portion 532 having an outer surface of a circular shape moves to the thickness-wise first guide 511. Here, since the thickness-wise first outer surface portion 531 having outer surface of a regular hexagonal shape moves from the thickness-wise first guide 511, the thickness-wise connector 530 may be rotated.

At this time, a hexagonal coupling portion 340 having a regular hexagonal shape is formed at an end of the thickness-wise rotary shaft 300, and a regular hexagon is also formed at the thickness-wise connector 530 to which the hexagonal coupling portion 340 of the thickness-wise rotary shaft 300 is coupled. That is, at least a portion of the perforated hole 533 of the thickness-wise connector 530, for example a portion coupled to the hexagonal coupling portion 340 of the thickness-wise rotary shaft 300, is formed to have a regular hexagonal shape.

Therefore, if a tool such as a hexagonal wrench is coupled to the thickness-wise connector 530 to give a pressure, the perforated hole 533 of the thickness-wise connector 530 formed in a regular hexagonal shape moves so as to be coupled to the hexagonal coupling portion 340 of the thickness-wise rotary shaft 300 more deeply (See FIGS. 11 and 12).

In addition, if the thickness-wise connector 530 is rotated using a tool such as a hexagonal wrench, the thickness-wise rotary shaft 300 coupled to the thickness-wise connector 530 also rotates together with the thickness-wise connector 530. In addition, if the thickness-wise rotary shaft 300 stops rotating, the hexagonal wrench is removed from the thickness-wise connector 530. If the hexagonal wrench is removed from the thickness-wise connector 530, in a state where the thickness-wise elastic member 520 is in contact with the pressing bar 534 of the thickness-wise connector 530, the elastic recovery force of the thickness-wise elastic member 520 is provided to the pressing bar 534 as shown in FIG. 11. Thus, the thickness-wise first outer surface portion 531 of the thickness-wise connector 530 is moved to the thickness-wise first guide 511 of the thickness-wise connector guide 510 and inserted therein.

Here, since the outer surface of the thickness-wise first outer surface portion 531 has a regular hexagonal shape and the inner surface of the thickness-wise first guide 511 also has a regular hexagon shape, if the thickness-wise first outer surface portion 531 is inserted into the thickness-wise first guide 511, the thickness-wise first outer surface portion 531 is prevented from rotating. That is, if the hexagonal wrench is removed from the thickness-wise connector 530, the thickness-wise connector 530 is caught by the thickness-wise connector guide 510 to prevent rotation, and the thickness-wise rotary shaft 300 coupled to the thickness-wise connector 530 is also prevented from rotating.

In other words, if the thickness-wise connector 530 is rotated using a tool such as a hexagonal wrench, the thickness-wise rotary shaft 300 also rotates together with the thickness-wise connector 530, so the interval between the first support portion 211 and the second support portion 221 of the cell support member 200 is adjusted. However, if the tool such as a hexagonal wrench is removed from the thickness-wise connector 530, the thickness-wise first outer surface portion 531 of the thickness-wise connector 530 is coupled to the thickness-wise first guide 511 of the thickness-wise connector guide 510 to prevent the thickness-wise rotary shaft 300 from rotating.

According to the above configuration, since the cell support member 200 supporting the center portion of the battery cell 700 is adjustable in the thickness direction of the battery cell 700, various battery cells 700 having various sizes in the length direction of the battery cells 700 may be transported using one transporting device. In addition, since the first support member 210 and the second support portion 221 of the cell support member 200 are moved by the operation of the thickness-wise moving member 400, it is easy to adjust the interval between the first support member 210 and the second support member 220.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery transporting apparatus, and may be used in industries related to batteries.

What is claimed is:

1. A battery transporting apparatus, comprising:
a frame member configured to support a battery cell;
a cell support member movably mounted to the frame member to be adjustable in a thickness direction of the battery cell among length, width and thickness directions of the battery cell and configured to support a center portion of the battery cell;
a rotary shaft coupled to the frame member; and
a moving member coupled to the cell support member and coupled to the rotary shaft to move along the rotary shaft when the rotary shaft rotates so that the cell support member is moved,
wherein the cell support member includes:
a first support member having a plurality of first support portions spaced apart from each other at preset intervals, each of the first support portions having a hollow; and
a second support member having a plurality of second support portions spaced apart from each other at preset intervals,
wherein the second support portions are formed smaller than the hollows of the first support portions, and
wherein the plurality of second support portions are movable through the hollows.

2. The battery transporting apparatus according to claim 1, wherein the first support portion includes:
a first straight section extending vertically;
a second straight section extending vertically and spaced apart from the first straight section; and
a third straight section configured to connect the first straight section and the second straight section.

3. The battery transporting apparatus according to claim 2,
wherein the first straight section, the second straight section, and the third straight section define the hollow.

4. The battery transporting apparatus according to claim 1, further comprising:
a rotating member coupled to the rotary shaft to rotate the rotary shaft,
wherein a first side of the rotary shaft is coupled to the frame member and a second side of the rotary shaft is coupled to the rotating member, and
wherein the rotary shaft rotates in association with the rotation of the rotating member.

5. The battery transporting apparatus according to claim 4, wherein the moving member includes:
a first moving member coupled to the first support member; and
a second moving member coupled to the second support member, and
wherein the first moving member and the second moving member move along the rotary shaft so that the first support member and the second support member move closer to each other or move away from each other.

6. The battery transporting apparatus according to claim 5, wherein the rotary shaft includes:
a first thread portion formed at a region to which the first moving member is coupled;
a second thread portion formed at a region to which the second moving member is coupled; and
a non-thread portion provided between the first thread portion and the second thread portion, and
wherein the first thread portion and the second thread portion have threads formed in opposite directions.

7. The battery transporting apparatus according to claim 4,
wherein the rotating member includes:
a connector guide coupled and fixed to the frame member;
a an elastic member provided to contact the rotary shaft; and
a connector inserted into the connector guide to press the elastic member so that the elastic member is elastically contracted.

8. The battery transporting apparatus according to claim 7,
wherein a perforated hole is formed in the connector, a pressing bar is provided vertically to an inner side of the connector, and the elastic member is inserted into the perforated hole to be pressed by the pressing bar.

9. The battery transporting apparatus according to claim 8,
wherein the connector guide includes:
a first guide having an inner surface of a regular hexagonal shape; and
a second guide having an inner surface of a circular shape,
wherein the connector includes:
a first outer surface portion having a regular hexagonal shape to correspond to the first guide; and
a second outer surface portion having a circular shape to correspond to the second guide.

* * * * *